United States Patent

[11] 3,608,699

[72] Inventor Arthur A. Voris, Jr.
 Inglewood, Calif.
[21] Appl. No. 815,081
[22] Filed Apr. 10, 1969
[45] Patented Sept. 28, 1971
[73] Assignee Standard Oil Company
 Chicago, Ill.

[54] CONTAINER TRANSPORT APPARATUS
 4 Claims, 2 Drawing Figs.
[52] U.S. Cl...................................................... 198/102,
 198/156, 198/165
[51] Int. Cl....................................................... B65g 37/00
[50] Field of Search............................................ 198/102,
 38, 22, 22 B, 34, 20, 28; 221/251

[56] References Cited
 UNITED STATES PATENTS
1,693,674 12/1928 Smith et al..................... 221/251
1,770,530 7/1930 Oslund......................... 198/22
2,285,267 6/1942 Gantzer......................... 198/22
2,352,761 7/1944 Bell............................. 198/34 UX Primary Examiner—Evon C. Blunk
Assistant Examiner—Alfred N. Goodman
Attorneys—Arthur G. Gilkes, William T. McClain and Ralph C. Medhurst ABSTRACT: The disclosure describes a container transport apparatus comprising conveyor means for conveying containers along a predetermined path, container-receiving means positioned at the end of the conveyor means, and gating means, positioned in advance of the container-receiving means and above the path of the containers. The gating means is in synchronization with the container-receiving means thereby effecting a continuous flow of containers from the conveyor means to the receiving means.

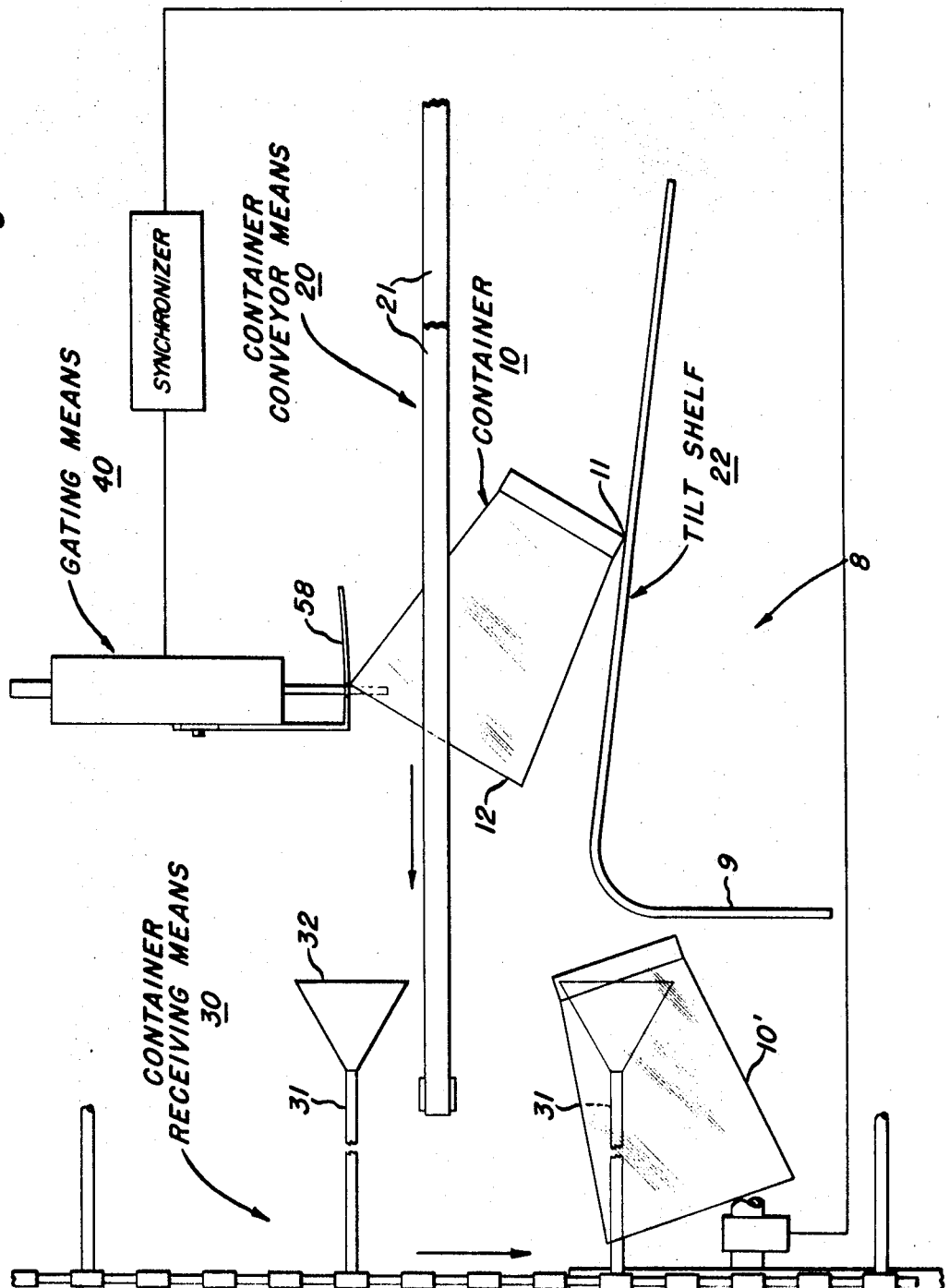

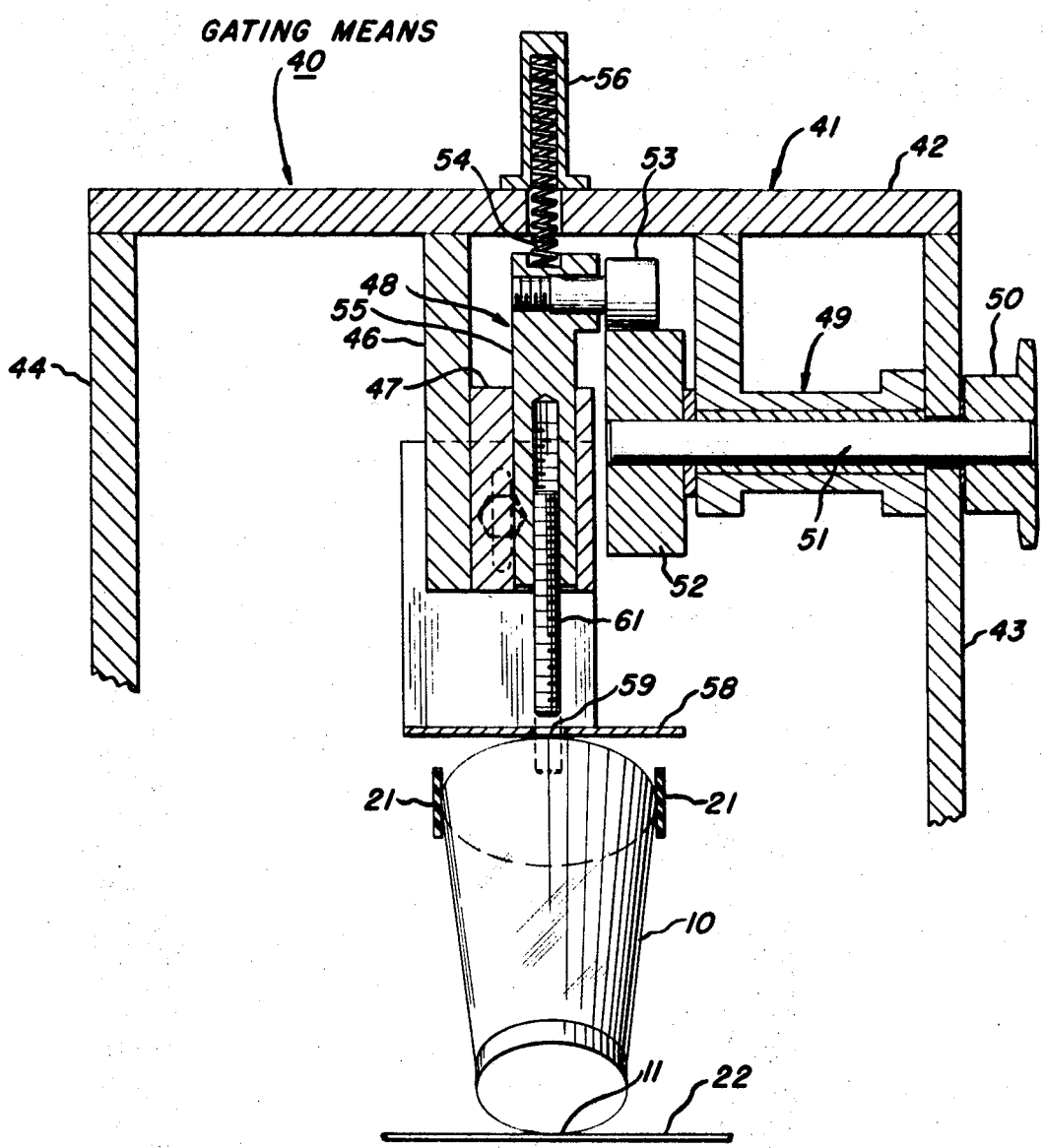

3,608,699

CONTAINER TRANSPORT APPARATUS

BACKGROUND OF THE INVENTION

In the field of plastics, as in general, it has become more common to mechanize many operations which were once manual; however, in many cases problems have arisen from such mechanization. Such is the case in the mechanized transport of containers. Mechanized transport of containers requires synchronized operations for handling such containers to avoid having them damaged, broken or backlogged. More specifically, one problem has been to develop an efficient gating means to control the flow of such containers as they are being transported by a conveyor means along a predetermined path toward a receiving means. In one case, for example, it has become desirable to transfer plastic containers from a conveyor means to a receiving means, which is comprised of a continuous chain moving sinuously in a vertical plane through a drying oven. The receiving means has horizontally extending arms capable of accepting the containers and retaining them while they travel on their way through the oven. However, the transfer of the containers in this case is plagued by inefficiency if the containers are not properly timed so that each one arrives at the horizontally extending arm at precisely the right time to be accepted thereby. Prior art solutions to this problem have been to construct a gating means to obstruct the path of the conveyed containers to prevent them from arriving at the receiving means when there is no arm to accept them. Such gating means have generally been of the type having two pins one extending from either side of the path. When the gate is actuated, the pins engage the container's periphery so as to interrupt the flow of containers. These prior art gating means have not been wholly satisfactory in that the two pins must be synchronized so that one pin does not release prematurely and cause the container to become misaligned and thus perhaps smear the printing which is intended to be dried in the oven. Improper synchronization of the two pins may also cause the cup to turn completely around so that it will arrive at the receiving means facing the wrong direction. Another inherent problem of having two pins synchronized in the gating means is that if a container happens to be exactly between these pins when the gating means is activated, causing the pins to be extended inwardly, the container will be trapped and cracked thereby. The invention of this disclosure provides a gating means, used in combination with a conveyor means and a receiving means, which avoids these prior art problems.

DESCRIPTION OF THE INVENTION

The invention can be broadly described as a container transport apparatus comprising conveyor means for conveying containers along a predetermined path, container-receiving means positioned at the end of the conveyor means, and gating means positioned in advance of the container-receiving means and above the path of the containers in synchronization with the container-receiving means effecting a continuous flow of containers from the conveyor means to the receiving means. The gating means is in synchronization with the container-receiving means so that the flow of containers along the predetermined path is regulated in such a manner that the receiving means does not damage containers but readily accepts them. Desirably, the conveyor means is comprised of two parallel conveyor belts which engage the containers at their outer peripheries, the containers being freely suspended from the belts except for a shelf engaging the lower edges of their sidewalls, thereby holding them in a tilted position. The container conveyor means continuously conveys containers beneath the gating means and to a container-receiving means. The timing of the arrival of the containers at the receiving means is most important since each container must be in exact position to be accepted by the container-receiving means or it will fall from the conveyor means thereby interrupting the continuity of the process and damaging or destroying the container.

The gating means is synchronized with the container-receiving means and precisely controls the flow of containers thereto. When necessary to momentarily stop the container and prevent it from arriving at the end of the conveyor means at a time when the receiving means could not accept it, the gating means is actuated to thrust downwardly from above a pin which engages the upper portion of the outer periphery of the container. The conveyor means continues to operate while the container is stopped, but cannot overcome the braking action of the pin. This type of gating means avoids the problems of the prior art in that gating from above eliminates the problems of synchronizing two pins projecting from the sides. It also has certain advantages in that the pin comes from above and is exactly centered with respect to the container's central axis thereby discouraging the container from twisting or rotating while stopped. Also if a container happens to be directly beneath the pin when the gate is activated the conveyor means yields and the container is stopped without breaking it. The pin itself is only long enough to contact an upper portion of the outer periphery of the container, thus, there is no chance that it could mark or scratch the sidewall of the container if the gate is activated immediately after such upper portion of a container periphery passes thereunder.

More specifically, the container conveyor means is comprised of two parallel conveyor belts which engage the outer periphery of a container between them. The lower edge of the container sidewall rests upon a tilt shelf which supports the container at an angle with respect to the vertical, thus a pickup arm of the container-receiving means of the container transport apparatus which approaches from above to accept a container may do so without damaging it. More specifically, the container pickup arm of the container-receiving means passes through the container's mouth thereby causing the container to tilt nearly parallel to the container pickup arm. The container reaches the edge of the tilt shelf in such position and leaves the conveyor belts to rest entirely upon the pickup arm, whereby transfer is complete. The gating means of the container transport apparatus provides the proper timing to effect the transfer.

DESCRIPTION OF THE DRAWINGS

FIG. 1 shows the schematic plan view of the container transfer apparatus.

FIG. 2 is an elevational view partly in section of the gating means.

DESCRIPTION OF THE PREFERRED EMBODIMENT

As shown in FIG. 1, container transport apparatus 8 comprises container conveyor means 20, receiving means 30, and gating means 40 above the conveyor means 20. Conveyor means 20 conveys container 10 past gating means 40 to receiving means 30. Dual conveyor belts 21 pressing against opposite sides of container 10 are used to convey the container 10. When the container 10's lower edge 11 strikes and rests upon tilt shelf 22, container 10 assumes a tilted position. Container 10 in such a position will be engaged by one of the container pickup arms 31 of container-receiving means 30, upon reaching the end of conveyor means 20. The container pickup arm 31 engages the periphery 12 of the container 10 and causes it to be tilted into a nearly horizontal position. Container 10 reaches overhanging edge 9 of tilt shelf 22 in the nearly horizontal position and leaves duel conveyor belts 21 to rest entirely upon container pickup arm 31, whereby transfer is complete. Container pickup arms 31 have attached to their ends holding means 32 which engage the interior of container 10' and retains it on receiving means 30 as shown in FIG. 1. Gating means 40, which is shown in greater detail in FIG. 2, controls the timing of the containers 10 as they are conveyed along the predetermined path.

Gating Means

Gating means 40 is comprised of a frame 41 having a back 42 and two sides 43 and 44. The back has a leg 46 attached thereto and extending downward therefrom between the two sides 43 and 44. Leg 46 supports sleeve 47 which restricts the motion of container stop means 48 to vertical motion, and also serves as a stop to restrict the extent of its downward projection. Container stop means 48 is comprised of cam follower 53, body 55 and pin 61. Cam 52 engages cam follower 53 of container stop means 48 so that when the camshaft is rotated by a connector means, for example, a sprocket wheel 50 and chain (not shown) rotary motion is transmitted from a source (not shown), and container stop means 48 is caused to move vertically. Back 42 also has attached thereto a camshaft support 49 which supports camshaft 51. Camshaft 51 has axially attached thereto cam 52. More specifically, the cam 52 causes the container stop means 48 to move upward to its upper position. Spring 54 coacting with spring retainer 56 returns container stop means 48 to its lower position as cam 52 continues to rotate. The flow of containers will be prevented when the container stop means 48 is in its lower position and allowed when in its upper position.

Shoe 58 having a hole 59 extends downward from leg 46 in such a manner that pin 61 of container stop means 48 protrudes therethrough when in its lower position. Shoe 58 prevents container 10 from creeping upward along pin 61 while stopped thereby, as shown in FIG. 2. For simplification of FIG. 2 only pin 61 is shown in dashed lines in its lower position; however, it is understood that all of container stop means 48 is in such lower position. Shoe 58 also prevents container 10 from being lifted into an upright position as container stop means 48 is moved vertically into its upper position. Shoe 58 is vertically adjustable to accommodate different-sized containers being conveyed.

The gating means 40 operates in the following manner. To effectively operate the conveyor means and the receiving means, it is necessary to control the timing of the containers reaching the receiving means. The gating means 40 provides the necessary timing to avoid loss or destruction of containers, and is synchronized with the receiving means 30 by, for example, driving both from the same power source. By compensating for the amount of time necessary for a container 10 to travel from the point below pin 61 of container stop means 48 to receiving means 30, it is possible to provide for the release of container 10 so that it arrives at the receiving means 30 at precisely the right time to be accepted. Containers not in proper position as they approach the gating means 40 must be stopped and released at a time when they will be accepted by the receiving means upon their arrival.

It is intended that container stop means 48, including pin 61, should not come down directly upon a container periphery 12. Occasionally, however, the pin 61 does come down upon the periphery 12 of a container 10. But two features have been designed into the gating means 40 to avoid damage to the container when this occurs. First, pin 61 has been made adjustable by providing for it to be threaded and screwed into container stop means 48. It can be adjusted so that it contacts the upper periphery 12 of the container 10 only to the extent necessary to prevent the conveying thereof, thus insuring that the container 10 will not be broken thereby. In addition, such adjustment can be used to facilitate larger or smaller containers. Secondly, the container stop means 48 has been designed to be returned to its lower position as cam 52 rotates by spring 54 coacting with spring retainer 56 to avoid the possibility of the positive force of the cam being imparted to the container. It is understood that further rotation of cam 52 moves container stop means 48 upward and compresses spring 54 allowing passage of containers thereunder. By varying the size of spring 54 in accordance with the type of container gated, the possibility of breakage can be avoided.

If necessary, gating means 40 can be operated without spring 54 relying upon gravity to return container stop means 48 to its lower position thereby avoiding any additional force, other than the weight of container stop means 48, being exerted on the container periphery. Also the container stop means 48 can be constructed of aluminum or other lightweight material to minimize its weight. These features are coupled with the advantage over the prior art methods of gating from above to utilize the inherent yield of the dual conveyor belts 21 so that containers would not be furnished sufficient support to allow them to be broken by the gating means.

I claim:

1. A container transport apparatus comprising: two parallel continuously moving belts and a tilt shelf positioned therebelow for conveying containers along a predetermined path; a plurality of container-receiving means mounted on a conveyor positioned at the end of the moving belts; and gating means positioned in advance of the container-receiving means and centered above the path of the containers; said gating means having a frame, a container stop means movably mounted on the frame, said container stop means including: an adjustable pin, a body, and a cam follower; said cam follower coupled to the frame in operating position with the cam follower of the container stop means, the cam follower being in synchronization with the movement of the plurality of container-receiving means; a shoe means coupled to the frame in the path of the adjustable pin having a hole therein to allow projection of the pin therethrough, the shoe means preventing containers from creeping up the pin when engaged thereby.

2. The container transport apparatus of claim 1 wherein the two parallel continuous moving belts are adjustable to accommodate various-sized containers.

3. The container transport apparatus of claim 1 wherein the shoe means is adjustable to accommodate various-sized containers.

4. The container transport apparatus of claim 1 wherein the tilt shelf is adjustable to accommodate various-sized containers.